May 10, 1927. A. W. LIMONT Re. 16,619

METHOD OF MANUFACTURING VALVE STEMS

Original Filed July 13. 1921

Inventor

Alexander W. Limont

By Henry E. Rockwell

Attorney

Reissued May 10, 1927. Re. 16,619

UNITED STATES PATENT OFFICE.

ALEXANDER W. LIMONT, OF BRIDGEPORT, CONNECTICUT.

METHOD OF MANUFACTURING VALVE STEMS.

Original No. 1,446,468, dated February 27, 1923, Serial No. 484,511, filed July 13, 1921. Application for reissue filed August 25, 1924. Serial No. 734,130.

This invention relates to improvements in the method of manufacturing pneumatic tire valve-stems and resides more particularly in a method for making such stems from tubing or shells drawn or welded.

The majority of valve-stems now upon the market are so constructed as to include certain specific structural features and standard sizes which are more or less fixed by the standardization of the valve stem holes through the tire-rims of automobile wheels, and it is therefore my object in the formation of a valve-stem in accordance with my present method, to maintain so far as possible these required features in order to permit the interchangeability of such parts as are now largely employed in and upon valve-stems of this character.

These commercial valve-stems are of a general elongated externally threaded cylindrical form having opposite flat sides and a head upon one end, and a reduced threaded end, forming a nipple arranged to receive the standard pump coupling. These stems further include a central longitudinal opening, portions of which are enlarged to receive the inside operative parts of the valve which are removably attached, and adapted to be renewed from time to time as occasion requires.

These commercial forms of valve-stems of standard dimensions, are all so far as I know, made of solid stock, viz., short pieces of round bars or rods which in the formation of valve-stems are drilled out longitudinally to form a passage therethrough, including a valve chamber and other required features. The exterior is also operated upon to form the head and to thread the peripheral portions. This method of manufacture requires solid and comparatively heavy blanks and produces a large percentage of waste, besides necessitating more operations and labor costs.

The object of my present invention is to provide a manufacturing method of producing valve-stems of the above class from hollow metal tubing or drawn shells whereby the cost of production is materially lessened, to provide a novel method whereby a shorter and lighter piece may be used than is now employed to produce a valve-stem or casing of a particular size and to utilize practically all of the material of said blank in the formation of the valve-stem, thus requiring a minimum amount of material, and labor, and relatively few operations.

It is a further object of the invention to provide a novel method of manufacturing commercial forms of valve-stems, and wherein slight modifications adapted for different forms of inner operative parts may be produced with little variation.

In the accompanying drawings forming a part of this specification, similar characters of reference denote like or corresponding parts throughout the several figures and of which:

Figure 1:
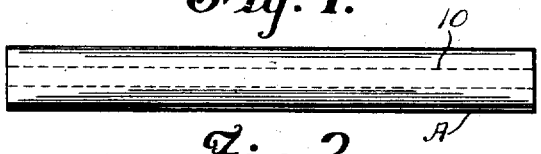
Fig. 1 shows a side elevation of a piece of tubing, of proper length and dimensions, from which a valve-stem may be formed in accordance with my improved manufacturing method.

In the carrying out of my improved method I may use either a piece of tubing A or drawn shell A′ of proper outside dimensions, having a central longitudinal hole 10 of suitable size to provide an annular wall of uniform thickness, length and strength as shown in Fig. 1, to produce a commercial form of valve-stem. I prefer, however, to use short pieces of brass tubing, which may be cut from long lengths formed in any suitable way to insure uniformity of size as shown in Fig. 1, but it will be obvious that drawn shells, such for instance as that suggested in Fig. 7, may be similarly employed with equally as good results.

Figure 2:
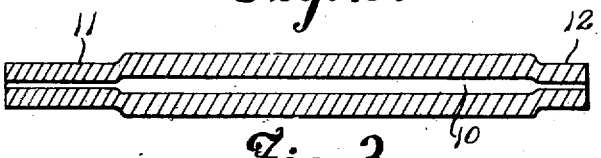
Fig. 2 shows a longitudinal section illustrating the same blank after the two end portions have been swedged to reduce their diameters as well as that of the hole therethrough.
Figure 7:
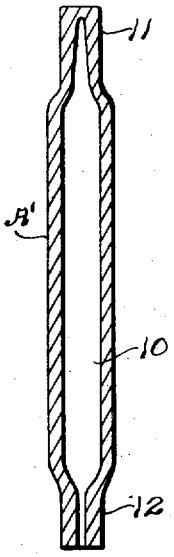
Fig. 7 shows a longitudinal section of a blank made from a drawn shell.
Figure 8:
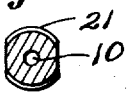
Fig. 8 is a cross section taken on line 8—8 of Fig. 5.

The first operation upon this blank A or A′ is that of reducing the opposite end portions 11 and 12 as shown in Figs. 2 and 7 respectively, to lengthen the tube and form the outside diameter of its end portions, as well as the size of the longitudinal holes 10 in said ends, the reduced end portions 11 from which the head 13 is formed being made longer than the other end 12 later to be threaded to receive the valve mechanism, and a cap to enclose the same.

Figure 3:
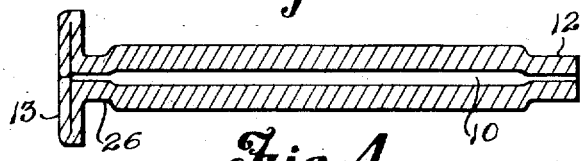
Fig. 3 shows a like longitudinal sectional view of the same blank after the head has been formed upon one end by an upsetting or swedging operation.
Figure 4:
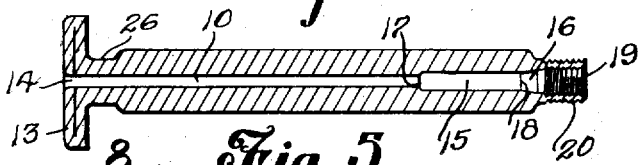
Fig. 4 is a further longitudinal sectional view showing the next two operations upon the blank, viz, that of reaming out and threading the cap end portion 12 and of drilling out the hole in the headed end.
Figure 5:
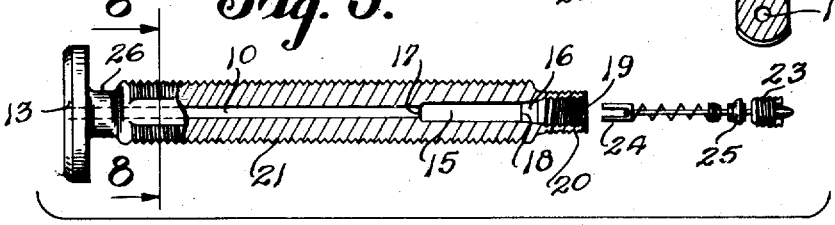
Fig. 5 is a longitudinal sectional view of a complete valve including the further operations of surface threading and reaming hole to form a pocket and interior threading for attachment of the valve member 23 shown adjacent thereto.

The longer reduced end portion 11 is next upset or headed, in suitable forming dies, to produce the head 13 as shown in Fig. 3. This heading operation also serves to close the hole 10 in the head end of the blank as is also shown in Fig. 3. This closed end is next reamed out as shown at 14 in Fig. 4 to again form a continuous passage through the stem, as required to permit of the flow of air to a tire tube, not shown. The opposite end 12 of the casing is also reamed out as shown in Figs. 4 and 5 to form the enlarged pockets 15 and 16 having two annular shoulders 17 and 18. The larger pocket 16 is threaded as indicated by 19 to receive the assembled removable valve parts, shown in Fig. 5. The threads 20 may be then cut to receive the closure cap, not shown, and the threads 21 on the body are next formed by either cutting or rolling as preferred and if desired the body of the stem may be flattened on opposite sides as is customary.

Figure 6:
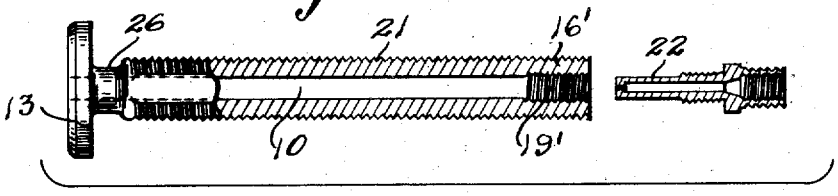
Fig. 6 shows a modified form of valve-stem, and a removable casing, the latter adapted to receive a valve and be detachably mounted in the valve stem.

In the method of making the modified form of stem shown in Fig. 6, the cap end 12 of the hole 10 is threaded as shown to accommodate a casing 22 which is adapted to contain valve-mechanism, shown in Fig. 5, and threaded for engagement with the threaded wall 19′ in the end pocket 16′ in the valve casing. This construction shown in Fig. 6 will admit of the use of other commercial forms of valves of this general character and is obviously not limited to the particular make shown.

The internal thread 19 serves especially for the threadable connection of the nut member 23 of the valve mechanism while the sleeve 24 rests against the inner shoulder 17. The second annular shoulder 18 forms a valve seat upon which the valve member 25 normally rests. The contracted neck portion 26 adjacent to the head is obviously formed by the first swedging operation and is further shaped when the head is swedged and is thus made to conform to the commercial types of valve stems whose necks are formed by cutting away excess stock from solid metal rod as heretofore mentioned.

What I claim is:

1. The method of forming a valve-stem from a hollow metal body having a hole therethrough, which consists in simultaneously reducing the size of the outer diameter of and the hole in one end portion of the body, then forming a head upon the other end, next operating upon the body to perfect a passage therethrough, and threading the inside and outside of the valve-stem.

2. The method of forming a valve-stem from a piece of tubing having a hole therethrough, which consists in simultaneously reducing the size of the outer diameter of and the hole in one end portion of the tubing, then forming a head and reduced neck portion upon the other end, next enlarging the holes in the ends and threading the inside and outside of the valve-stem.

3. The method of forming a valve-stem from a tubular blank, which consists in first reducing the two end portions of said blank by swedging one end portion longer than the other, then swedging a head on said longer end portion, next reaming out the hole in the ends of the blank to form an opening through the blank and finally in threading the surface of the blank.

4. The method of forming a valve-stem from a tubular blank, which consists in first reducing the two end portions of said blank by swedging, then heading one of the swedged end portions, reaming out the two end portions to perfect a passage through the blank, and to form valve pockets therein, and finally threading the reduced end and the body portion of the blank.

5. The method of forming a valve-stem, which consists in providing a tubular metal blank of required size, then swedging one end portion and reducing the opening therein and forming a head and neck on said end, and finally internally and externally threading the stem to receive a valve and closure cap.

6. The method of forming a valve stem or casing, which consists in using a relatively light tubular blank of specific length, then drawing the tube longitudinally by swedging the end portions only, next heading one of said drawn ends and enlarging the holes in the ends and threading the outer and inner surfaces.

7. The process of making a tire valve stem or the like, which comprises folding over upon itself the wall of a piece of tubular stock at one end thereof to form a flat disk-like head, comprising a plurality of layers of material.

8. The process of making a tire valve stem or the like, which comprises cutting a blank of suitable length from a piece of tubular stock having a bore therethrough, and folding over upon itself, the wall of said blank at one end thereof to form a flat disk-like head, comprising a plurality of layers of material.

9. The process of making a tire valve stem or the like, which comprises cutting a blank of suitable length from a piece of tubular stock having a bore therethrough and folding over upon itself, the wall of said blank at one end thereof to form a flat disk-like head of two ply thickness.

10. The method of making a tire valve stem or the like, which comprises cutting a blank of suitable length from a piece of tubular stock, reducing the exterior diameter of and the bore in one end portion, and then folding over upon itself the wall of the blank at said reduced portion to form a flat disk-like head.

11. The method of making a tire valve stem or the like, from a piece of hollow tubing which consists in simultaneously reducing the size of the outer diameter of and the bore in one end portion of the tubing and displacing the wall of the tubing at said reduced end to form a flat disk-like head.

12. The method of making a tire valve stem or the like, which comprises cutting from a piece of tubing of circular cross-section a blank of suitable length, reducing one end of the blank, displacing the wall at said reduced portion to form a two ply head, and forming opposite flat sides upon the body of the blank.

13. The method of making a tire valve stem from a piece of hollow tubing, which comprises simultaneously reducing the size of the outer diameter and the hole in one end portion of the tubing, and then displacing the wall of a part of said reduced portion to form a flat disk-like head thereby leaving a reduced neck between the head and the body of the blank.

14. The method of making a tire valve stem from a piece of hollow tubing, which comprises simultaneously reducing the size of the outer diameter and the hole in one end portion of the tubing, and then displacing the wall of a part of said reduced portion to form a flat disk-like head thereby leaving a reduced neck between the head and the body of the blank, and forming opposite flat sides upon the body of the tubular blank.

15. The method of making a tire valve stem or the like from a piece of hollow tubing, which consists in simultaneously reducing the size of the outer diameter of and the bore in one end portion of the tubing and displacing the wall of the tubing at said reduced end to form a flat disk-like head of two-ply thickness.

In witness whereof, I have hereunto set my hand this 21st day of August, 1924.

ALEXANDER W. LIMONT.